United States Patent
Dal Mutto et al.

(10) Patent No.: US 9,392,262 B2
(45) Date of Patent: Jul. 12, 2016

(54) SYSTEM AND METHOD FOR 3D RECONSTRUCTION USING MULTIPLE MULTI-CHANNEL CAMERAS

(71) Applicant: Aquifi, Inc., Palo Alto, CA (US)

(72) Inventors: Carlo Dal Mutto, Mountain View, CA (US); Abbas Rafii, Palo Alto, CA (US); David Demirdjian, Arlington, VA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 14/641,092

(22) Filed: Mar. 6, 2015

(65) Prior Publication Data

US 2015/0256813 A1 Sep. 10, 2015

Related U.S. Application Data

(60) Provisional application No. 61/949,960, filed on Mar. 7, 2014, provisional application No. 61/977,538, filed on Apr. 9, 2014.

(51) Int. Cl.

| | |
|---|---|
| H04N 5/30 | (2006.01) |
| H04N 13/02 | (2006.01) |
| G06T 7/00 | (2006.01) |
| G06K 9/46 | (2006.01) |
| H04N 5/33 | (2006.01) |
| H04N 9/04 | (2006.01) |
| G06K 9/20 | (2006.01) |

(52) U.S. Cl.
CPC .......... *H04N 13/0239* (2013.01); *G06K 9/2036* (2013.01); *G06K 9/46* (2013.01); *G06T 7/0051* (2013.01); *G06T 7/0073* (2013.01); *G06T 7/0075* (2013.01); *H04N 5/30* (2013.01); *H04N 5/33* (2013.01); *H04N 9/045* (2013.01); *G06K 2009/4666* (2013.01); *G06K 2209/401* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 2007/0153335 A1* | 7/2007 | Hosaka | H04N 1/58 358/463 |
| 2013/0100256 A1* | 4/2013 | Kirk | G06T 7/0057 348/48 |
| 2013/0229499 A1* | 9/2013 | Zhao | G06F 3/0482 348/51 |
| 2015/0229915 A1* | 8/2015 | Kirk | H04N 5/33 348/51 |

* cited by examiner

*Primary Examiner* — Hung Dang
*Assistant Examiner* — Sungyoun Park
(74) *Attorney, Agent, or Firm* — Lewis Roca Rothgerber Christie LLP

(57) ABSTRACT

A method for three-dimensional reconstruction of a scene includes: controlling a projection source to emit invisible light toward the scene; while the projection source is emitting light: controlling a first multi-channel image sensor to capture a first image, the first multi-channel image sensor including visible light detecting pixels and invisible light detecting pixels, the first image including a first invisible light channel and a first visible light channel; controlling a second multi-channel image sensor to capture a second image substantially simultaneously as the capture of the first image, the second multi-channel image sensor including visible light detecting pixels and invisible light detecting pixels, the second image including a second invisible light channel and a second visible light channel; performing stereo analysis of the first image and the second image in accordance with the invisible light channels and the visible light channels to generate a depth map.

20 Claims, 11 Drawing Sheets

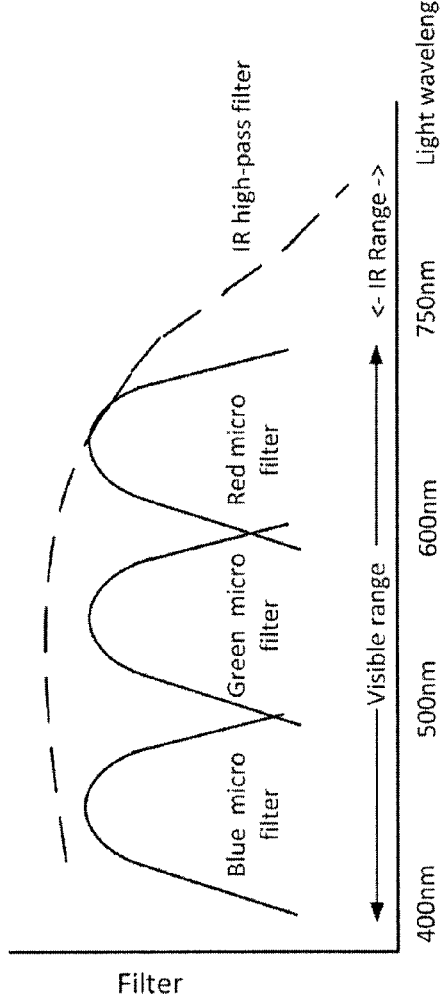
FIG. 3A
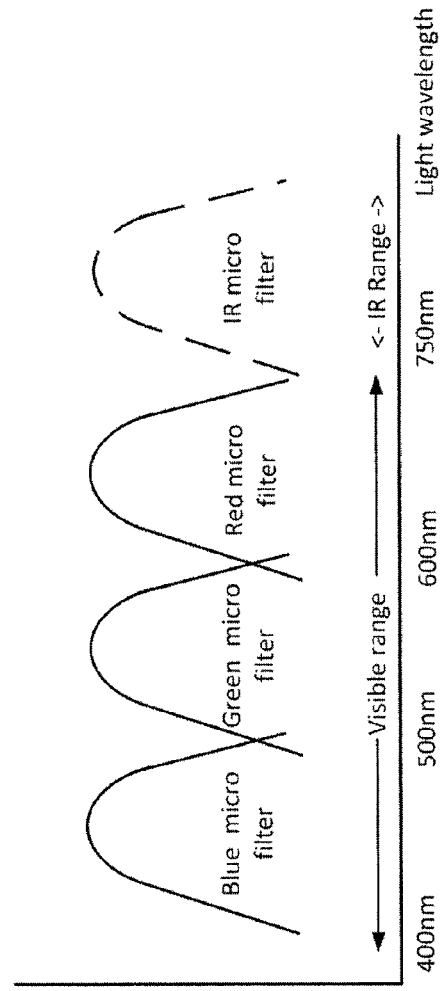
FIG. 3B
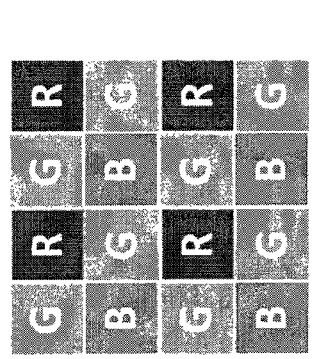
RGB Camera
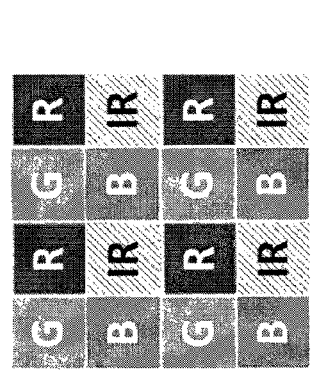
RGB-IR Camera

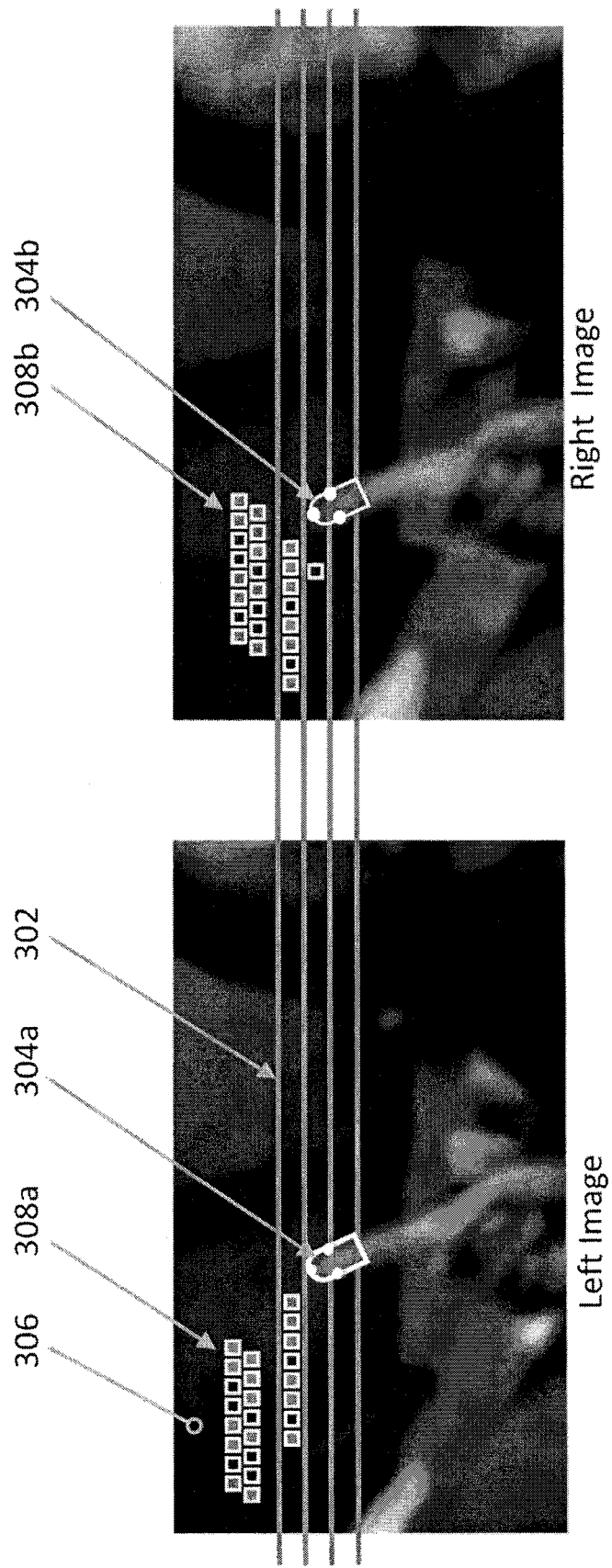

SYSTEM AND METHOD FOR 3D RECONSTRUCTION USING MULTIPLE MULTI-CHANNEL CAMERAS

CROSS-REFERENCE TO RELATED APPLICATIONS

This application claims the benefit of U.S. Provisional Patent Application No. 61/949,960, titled "Multi-Channel Multi-Camera for 3D Reconstruction," filed in the United States Patent and Trademark Office on Mar. 7, 2014, the entire disclosure of which is incorporated herein by reference. This application also claims the benefit of U.S. Provisional Patent Application No. 61/977,538, titled "Multi-Channel Multi-Camera for 3D Reconstruction," filed in the United States Patent and Trademark Office on Apr. 9, 2014, the entire disclosure of which is incorporated herein by reference.

FIELD

Aspects of embodiments of the present invention relate to systems and methods for performing 3D reconstruction of a scene using multiple multi-channel cameras.

BACKGROUND

Good quality 3D data of an environment or "scene" can be used for many applications including 3D computer interaction, 3D mapping, gaming, 3D visualization, and so on. Standard techniques for producing depth maps (e.g., a 3D cloud of pixels) in real-time using multiple (e.g., at least two) calibrated cameras (e.g., conventional, low-cost, visible light cameras) produces depth maps having holes or artifacts in regions corresponding to parts of the scene that do not have texture or that have repeating patterns, or where the ambient light is not sufficient to produce good contrast and texture (the "aperture problem"). Furthermore, various existing techniques for producing 3D points from the captured data can be expensive in terms of computer processing power and memory. Other techniques for producing 3D data may have high power or energy requirements and bulky hardware.

SUMMARY

Embodiments of the present invention relate to a system and method for producing good quality 3D data under various ambient light conditions using multiple ordinary, low power sensors.

According to one embodiment of the present invention, a system for three-dimensional reconstruction of a scene includes: a first multi-channel image sensor including a plurality of visible light detecting pixels and a plurality of invisible light detecting pixels; a second multi-channel image sensor including a plurality of visible light detecting pixels and a plurality of invisible light detecting pixels; a projection source; a processor; and a memory storing instructions that, when executed by the processor, cause the processor to: control the projection source to emit invisible light toward the scene; while the projection source is emitting light: control the first multi-channel image sensor to capture a first image, the first image including a first invisible light channel and a first visible light channel; control the second multi-channel image sensor to capture a second image substantially simultaneously as the capture of the first image by the first multi-channel image sensor, the second image including a second invisible light channel and a second visible light channel; perform stereo analysis of the first image and the second image in accordance with the first and second invisible light channels and the first and second visible light channels to generate a depth map; and output the depth map.

The memory may further store instructions that, when executed by the processor, cause the processor to perform stereo analysis of the first image and the second image by: performing stereo analysis of the first invisible light channel and the second invisible light channel to generate a coarse depth map; and applying a cross-bilateral filter on the coarse depth map with weights from the first visible light channel and the second visible light channel to generate the depth map.

The memory may further store instructions that, when executed by the processor, cause the processor to perform stereo analysis of the first image and the second image by: up-sampling the coarse depth map to a resolution of the first and second visible light channels.

The memory may further store instructions that, when executed by the processor, cause the processor to: control the first multi-channel image sensor to capture an initial image before controlling the projection source to emit invisible light toward the scene; and identify a region of interest in the initial image.

The memory may further store instructions that, when executed by the processor, cause the processor to: detect a feature within the region of interest; identify a minimum disparity bound in accordance with the feature; and perform the stereo analysis in accordance with the minimum disparity bound and only within the region of interest.

The memory may further store instructions that, when executed by the processor, cause the processor to: identify a maximum disparity bound in accordance with the feature; and perform the stereo analysis in accordance with the maximum disparity bound.

The projection source may include a scanner mirror and a light source configured to emit the invisible light, and the processor may be configured to control the scanner mirror to direct the invisible light emitted by the light source toward only a portion of the scene corresponding to the region of interest.

The projection source may be configured to emit infrared light, and the invisible light detecting pixels may be configured to detect infrared light.

The first visible light channel may include red, blue, and green color channels, and the second visible light channel may include red, blue, and green color channels.

The projection source may be configured to emit the invisible in a pattern.

The memory may further store instructions that, when executed by the processor, cause the processor to perform stereo analysis of the first image and the second image by: performing stereo analysis of the first and second invisible light channels to generate an invisible light depth map; performing stereo analysis of the first and second visible light channels to generate a visible light depth map; and combining the invisible light depth map and the visible light depth map to generate the depth map.

According to one embodiment of the present invention, a method for three-dimensional reconstruction of a scene includes: controlling, by a processor, a projection source to emit invisible light toward the scene; while the projection source is emitting light: controlling a first multi-channel image sensor to capture a first image, the first multi-channel image sensor including a plurality of visible light detecting pixels and a plurality of invisible light detecting pixels, the first image including a first invisible light channel and a first visible light channel; controlling a second multi-channel image sensor to capture a second image substantially simultaneously as the capture of the first image by the first multi-channel image sensor, the second multi-channel image sensor including a plurality of visible light detecting pixels and a plurality of invisible light detecting pixels, the second image including a second invisible light channel and a second visible light channel; performing, by the processor, stereo analysis of the first image and the second image in accordance with the first and second invisible light channels and the first and second visible light channels to generate a depth map; and outputting, by the processor, the depth map.

The performing stereo analysis of the first image and the second image may include: performing, by the processor, stereo analysis of the first invisible light channel and the second invisible light channel to generate a coarse depth map; and applying, by the processor, a cross-bilateral filter on the coarse depth map with weights from the first visible light channel and the second visible light channel to generate the depth map.

The performing stereo analysis of the first image and the second image may further include up-sampling the coarse depth map to a resolution of the first and second visible light channels.

The method may further include: controlling the first multi-channel image sensor to capture an initial image before controlling the projection source to emit invisible light toward the scene; and identifying a region of interest in the initial image.

The method may further include: detecting, by the processor, a feature within the region of interest; identifying, by the processor, a minimum disparity bound in accordance with the feature; and performing the stereo analysis in accordance with the minimum disparity bound and only within the region of interest.

The method may further include: identifying a maximum disparity bound in accordance with the feature; and performing the stereo analysis in accordance with the maximum disparity bound.

The projection source may include a scanner mirror and a light source configured to emit the invisible light, and the method may further include controlling the scanner mirror to direct the invisible light emitted by the light source toward only a portion of the scene corresponding to the region of interest.

The projection source may be configured to emit infrared light, and the invisible light detecting pixels may be configured to detect infrared light.

The first visible light channel may include red, blue, and green color channels, and the second visible light channel may include red, blue, and green color channels.

The projection source may be configured to emit the invisible in a pattern.

The performing the stereo analysis may include: performing stereo analysis of the first and second invisible light channels to generate an invisible light depth map; performing stereo analysis of the first and second visible light channels to generate a visible light depth map; and combining the invisible light depth map and the visible light depth map to generate the depth map.

BRIEF DESCRIPTION OF THE DRAWINGS

The accompanying drawings, together with the specification, illustrate exemplary embodiments of the present invention, and, together with the description, serve to explain the principles of the present invention.

FIGS. 3A and 3B compare the architecture of a conventional RGB camera sensor with that of a multi-channel RGB-IR camera sensor.

FIGS. 4A and 4B are left and right images of a scene captured by two different cameras of a system according to one embodiment of the present invention.

DETAILED DESCRIPTION

Figure 1:
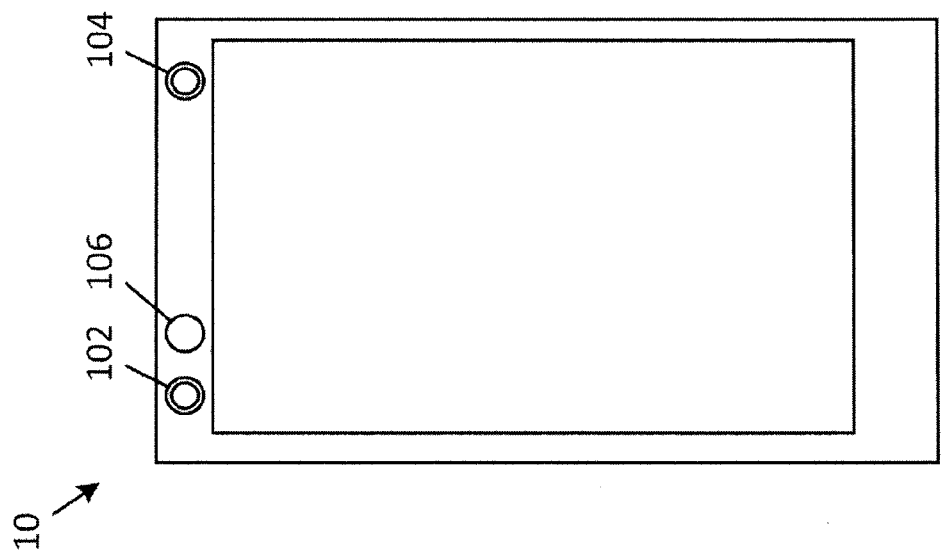
FIG. 1 is a schematic diagram illustrating a 3D reconstruction system according to one embodiment of the present invention integrated into a computing device.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to systems and methods for three-dimensional (3D) reconstruction of scenes using multiple multi-channel image sensors. As used herein, the term "multi-channel" refers to image sensors that are capable of detecting both visible and invisible light such as infrared (IR) light. In addition, systems and methods according to embodiments of the present invention may include a projection source (or illumination source) configured to emit invisible light that is detectable by the image sensor (e.g., an infrared light projector). By combining captured visible and invisible light data, embodiments of the invention are capable of detecting and reconstructing 3D representations of scenes (which may be referred to as a "depth map" of a scene) with good performance in low light or low texture portions of the scene, while incurring lower costs. In addition, by using sensors that are capable of capturing both visible light and IR light, the same hardware can be used both for 3D reconstruction and capturing images for display to users (e.g., for video conferencing applications).

Stereo or multi-camera techniques are capable of producing three-dimensional (3D) data at relatively low cost by capturing, substantially simultaneously, multiple images of the same scene from multiple points of view using conventional image sensors. Depth information can be obtained by matching features (such as patterns and scene texture information) detected in one image with the same features detected in another image and then measuring the disparity between the locations of the features in each image, where a greater degree of disparity indicates that an object is closer to the cameras. Reconstruction of 3D data (or "depth information" or "depth maps") from stereo visible light images is known in the field of computer vision and is described in a variety of sources such as D. Scharstein and R. Szeliski, A taxonomy and evaluation of dense two-frame stereo correspondence algorithms, *International Journal of Computer Vision*, 47(1/2/3):7-42, April-June 2002. (hereinafter "Scharstein et al."), the entire disclosure of which is incorporated herein by reference.

Generally, stereo techniques fall into three categories: local methods, global methods, and semi-global methods. In local methods, the disparity computation depends only on the pixel values within a finite pixel neighborhood (e.g., an 8 pixel by 8 pixel region). The pixel values from the first image are used to derive a similarity score to potentially corresponding pixels in the second image (e.g., pixels in the same portion of the second image). Global approaches, on the other hand, aim to solve an optimization problem that minimizes a global cost function that combines a data term similar to the similarity score from the local method with a smoothness term. Semi-global methods attempt to fall between these two extremes. Generally, the more global an algorithm is, the slower its runtime. As such, generally, only local methods are typically capable of running at full frame rate (e.g., 30 frames per second).

In a passive stereo environment such as an ambient light environment, it may be difficult to obtain a unique correspondence in homogeneous regions or regions with low texture (e.g., objects that are a single color, such as flat, texture-less walls), in regions with only one dominant gradient direction, and with repetitive textures (e.g., a patterned shirt, a wall covered with patterned wallpaper, a human hand, a human's eyes and ears). As such, the output of such techniques may include undesired artifacts or holes.

In other systems for 3D reconstruction, a projector (or projection source or illumination source) illuminates a scene and a detector that is offset from the projector captures light that is reflected by objects in the scene. The detected reflections of the projected light are used to reconstruct a 3D representation of the scene. The patterned light may be in an invisible portion of the spectrum such as infrared (IR). This allows illumination of a scene in low light situations, where illumination using visible light may be disruptive (like, for example, the flash of a standard camera) and may be dangerous (e.g., when a laser is used for illumination). Invisible light illumination can avoid this undesired effect while still illuminating the scene for purposes of capture.

A projection source may use a variety of types of light to assist in the 3D reconstruction process.

Illumination refers to light that is emitted primarily for illuminating the scene when a useful spectrum of light in the wavelength of interest is weak or not present in the ambient light. For example, infrared light may be emitted to illuminate a scene when detecting reflections using an infrared sensor.

Coded light refers to a light pattern that allows a detector to locate a particular patch of the pattern in the overall pattern. For instance, suppose the pattern is a 10×10 Cartesian product table. If we detect 7×3 on the scene, we can reason that this is the cell at row 7 and column 3 of the overall pattern.

Structured light refers to a pattern that has some structure to it, such as a repeated sine wave, or a repeating or non-repeating De Brujin sequence. The structured light may be used both for illumination and to assist the 3D reconstruction algorithm to calculate disparity more accurately. Note that there is not enough information to estimate the correspondence between the projected and the acquired pattern from the acquired pattern itself and therefore the depth is calculated based on the detected disparity.

Temporal patterns refer to light patterns that change over time, such as projecting three sinusoids at different phases. The sensor performs multiple captures of the reflections of each of the patterns that are sequentially applied to the scene over time. However, techniques using temporal patterns generally do not work well with moving objects because the positions of the objects may change while the light patterns are changing and because such systems assume that the pattern is applied to the same scene each time.

Embodiments of the present invention are directed to systems and methods for 3D reconstruction by projecting invisible light onto a scene and capturing the scene using image sensors or cameras capable of detecting both visible light and invisible light. By combining information from detected visible light features with information from the detected invisible light pattern, aspects of embodiments are capable of producing a high quality 3D reconstruction of a scene. Furthermore, by using cameras that can detect both visible light and invisible light, depth calculations using both detected visible light and detected invisible light information can be performed more accurately and with fewer computational resources over systems containing separate visible and invisible light cameras. This is because no transformation or warping is necessary to shift perspective between the invisible light cameras and the visible light cameras.

FIG. 1 is a schematic diagram illustrating a 3D reconstruction system according to one embodiment of the present invention integrated into a computing device such as a mobile phone 10. As seen in FIG. 1, the 3D reconstruction system includes a first camera 102, second camera 104, and a projection source 106. Although the 3D reconstruction system is illustrated here as a being a component of mobile phone 10, embodiments of the present invention are not limited thereto and may be included in other types of devices such as laptop and desktop computers, tablet computers, video game consoles, automatic teller machines, automobiles, etc.

Figure 2:
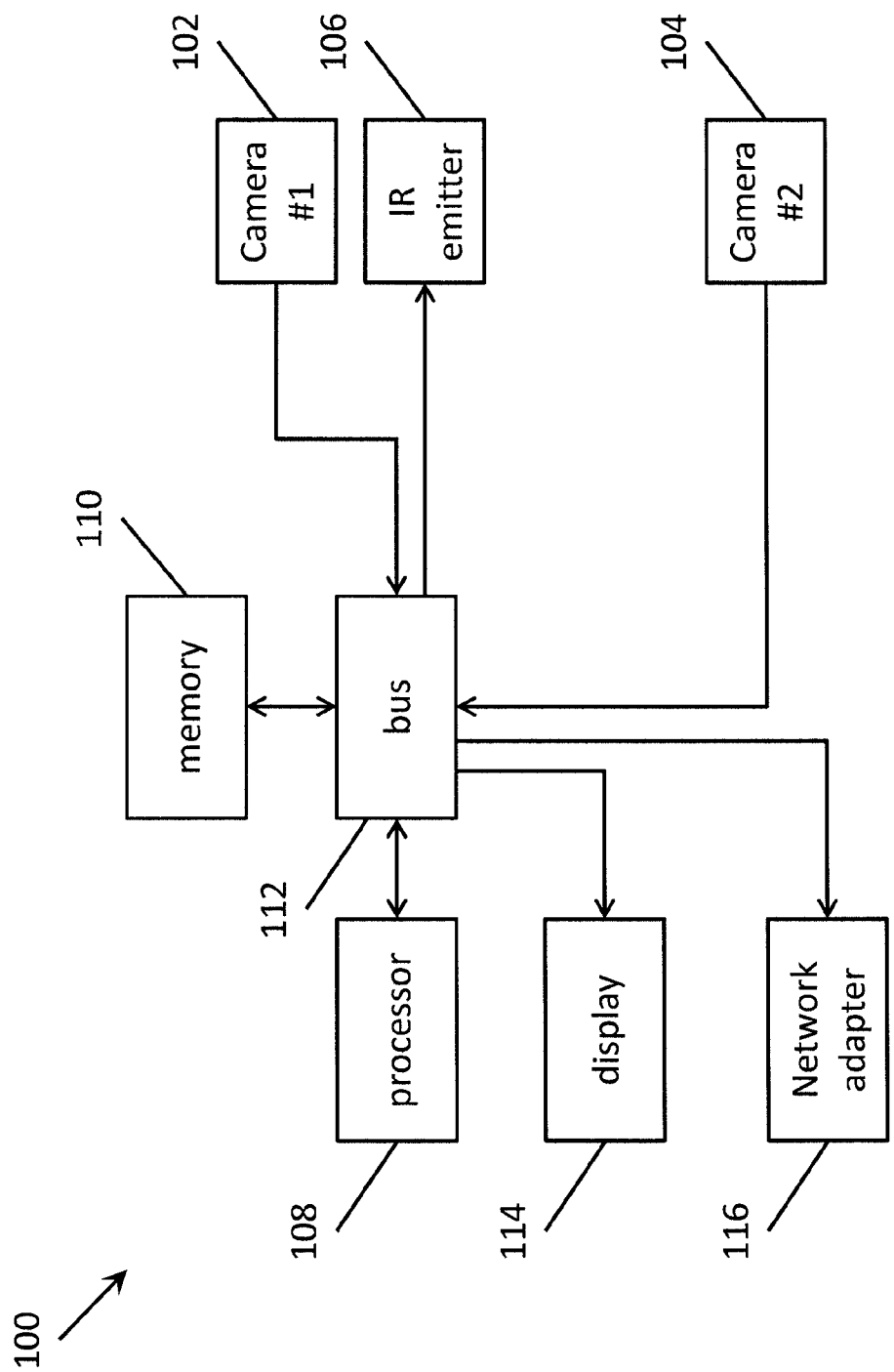
FIG. 2 is a block diagram illustrating a 3D reconstruction system 100 according to one embodiment of the present invention.

FIG. 2 is a block diagram illustrating a 3D reconstruction system 100 according to one embodiment of the present invention. The 3D reconstruction system 200 includes the first camera 102, the second camera 104, and the projection source 106 (or illumination source). The 3D reconstruction system may also include a processor 108 and memory 110, wherein the processor may be a graphics processing unit (GPU), a more general purpose processor (CPU), an appropriately configured field programmable gate array (FPGA), or an application specific integrated circuit (ASIC). The various components may communicate with one another over a system bus 112. Additional components such as a display 114 and a network adapter 116 may also be coupled to the system bus to allow the device to display images and to communicate with other devices.

The first camera 102 and the second camera 104 may be calibrated to produce rectified images and may be registered (e.g., aligned) with respect to each other. The first camera 102 and the second camera 104 may also be mounted on a rigid platform to retain their respective registration after the calibration process. The cameras may be located adjacent a same edge of the device, as shown in FIG. 1. In other embodiments, the cameras are located at different edges of the device (e.g., the first camera 102 may be located at an upper edge of the device and the second camera 104 may be located at a bottom edge of the device), thereby increasing the baseline (e.g., the distance between the cameras) and thereby allowing for longer range applications due to increased disparity between the cameras.

FIGS. 3A and 3B compare the architecture of a conventional RGB camera sensor with that of a multi-channel sensor such as an RGB-IR camera sensor. Generally, as shown in FIG. 2A, a conventional RGB camera sensor includes pixels arranged in a "Bayer layout" or "RGBG layout," which is 50% green, 25% red, and 25% blue. Band pass filters (or "micro filters") are placed above individual photodiodes for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire chip) which further blocks signals in an IR portion of electromagnetic spectrum, as illustrated by the dashed line in FIG. 2A.

A multi-channel sensor as illustrated in FIG. 2B is substantially similar to a conventional RGB sensor, but may include different color filters. For example, as shown in FIG. 2B, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm).

The multi-channel sensor allows substantially simultaneous or concurrent collection of both visible and invisible light in a scene. As such, when the scene is illuminated by an IR light source, the multi-channel sensor can provide both visible light information and invisible light from the reflected patterns for computer vision applications.

In addition, in circumstances where the scene does not have visible light (e.g., a darkened room or at night), there is substantially no information transmitted in color pixels. In one embodiment of the present invention, the processor 108 may propagate the value of the IR pixels to neighboring color pixels in accordance with rules. Therefore, the resulting image may have the full resolution although some of the pixels have estimated values. For instance, for a location in the image corresponding to a blue (B) pixel in FIG. 3B, the IR values from the two adjacent IR pixels to the left and right of the blue pixel can be combined (e.g., averaged) to generate a value for that location. Similarly, for a location in the image corresponding to a red (R) pixel in FIG. 3B, the IR values from the two adjacent IR pixels above and below the red pixel can be combined (e.g., averaged) to generate a value for that location. For the locations in the image corresponding to green (G) pixel locations in FIG. 3B, values of a number of the neighboring IR pixels (e.g., all four IR pixels or two of the neighboring IR pixels) may be combined (e.g., averaged) to generate a value for that location.

Embodiments of the present invention are not limited to multi-channel sensors of the RGB-IR variety. For example, the multi-channel sensor may be a grayscale-IR sensor that only includes one type of band-pass filter within the visible range and one type of band-pass filter in the infrared range.

The projection source 106 is configured to project a pattern in an area within the field of view of the cameras 102 and 104. The projection source 106 may emit light in an invisible portion of the spectrum, such as in the infrared (IR) portion of the spectrum. In some embodiments, the projection source 106 is located between the first camera 102 and the second camera 104. The projection source 106 may be collinear with the first and second cameras 102 and 104 or may be non-collinear the first camera and the second camera. The projection source 106 may be in an offset position such that it is closer to one of the cameras than to the other camera (e.g., closer to the first camera than the second camera).

The position of the projection source 106 with respect to the cameras affects the amount of shadowing at the edges of objects in the scene (e.g., 3D discontinuities in the scene). A shadow area, with respect to the projection source 106 and the cameras 102 and 104, is an area that is seen by either projection rays or camera rays but not both. Similarly, the shadow area with respect to the cameras 102 and 104 is an area that is seen only by the first camera 102 or only the second camera 104, but not both cameras.

According to one embodiment of the present invention, the projection source 106 projects spatially encoded light onto a scene to improve 3D reconstruction in substantially non-textured or repetitively textured surfaces. Spatial encoding only requires capture at one point in time and therefore is suitable for the detection of the depth of moving objects. In an RGB-IR camera, the IR channel can be used to capture the IR spatial pattern.

The visible light channels (e.g., the red, green, and blue channels) captured by a multi-channel image sensor can also be used to produce good quality depth data in portions of the scene that are a sufficiently well-lit and that have sufficient texture or edges.

Because the multi-channel cameras of systems according to embodiments of the present invention each capture an image of the scene substantially simultaneously, it is possible to use both the invisible spatial pattern and the visible scene texture information to solve the matching problem.

For example, FIGS. 4A and 4B are left and right images of a scene that were captured substantially simultaneously (e.g., within 1 millisecond of each other and having similar exposure time) by the first camera 102 and second camera 104, respectively, according to one embodiment of the present invention.

The epipolar geometry defines the geometrical relationship of the images captured by the cameras of a stereo capture system. Referring to FIGS. 4A and 4B, epipolar lines 302 of a pair of rectified stereo images can be made parallel with the horizontal axis of the cameras by computationally rotating and adjusting the scale of the first and second cameras 102 and 104. Thus, for example, the detected image of a fingertip 304*a* as shown in the left image FIG. 4A will lie on substantially the same epipolar line of the epipolar lines 302 as the image of the fingertip 304*b* in the right image FIG. 4B. Therefore, an image feature detected in a first (or master) image between a set of epipolar lines can be more easily found in a second (or slave) image by searching for that feature between the same set of epipolar lines in the second image.

In regions of the scene that have low texture or no texture 306 and in regions of the scene lacking in edges, it may be difficult to establish corresponding points between the first and second images. For example, a blank wall may have low texture and therefore it may be difficult to determine which portions of the wall correspond to various depths (in other words, it may be difficult to determine the distance between the camera and various parts of the wall).

However, projecting an appropriate pattern onto a scene can produce an artificial texture 308a and 308b that can be captured by the cameras. The captured artificial texture (or "local pattern") can then be used to match corresponding points between the first and second images in regions that would otherwise not have included a texture.

In one embodiment, the pattern has the properties that no pixel neighborhood appears in RGB-IR space (e.g., from the superposition of scene texture and illumination pattern) to be: either homogeneously textured; textured by only one dominant gradient along the direction of the epipolar line; or textured with a pattern that appears similar to that of another pixel neighborhood (e.g., avoiding repetitive patterns). By projecting such a pattern onto the scene, standard local methods can be used with the multi-channel data (the visible light data and invisible light data) to yield a dense reconstruction of the scene.

In some embodiments, pyramidal representations and multi-resolution analysis can be used to improve the efficiency of stereo matching estimation. In pyramidal representation schemes, the original images may be repeatedly subsampled to produce an image pyramid. Matching algorithms may then be recursively applied to lower resolution images of the pyramid, using the output to assist in processing higher resolution images (see, e.g., G. Van Meerbergen, M. Vergauwen, M. Pollefeys, L. J. Van Gool, "A Hierarchical Symmetric Stereo Algorithm Using Dynamic Programming," International Journal of Computer Vision, 2002). However, some patterns that are used in stereo vision, such as De Bruijn sequences, do not exhibit non-repeatability properties for subsampled patterns and therefore would not be appropriate for use in a pyramid representation for stereo estimation.

As such, embodiments of the present invention may use a pattern having non-repeating sub-patters at multiple image resolutions. In one such embodiment, techniques from digital stenography (see, e.g., F. A. P. Petitcolas, R. J. Anderson, M. G. Kuhn, "Information hiding-a survey," Proceedings of the IEEE, vol. 87, no. 7, 1999.) are used to insert patterns within the main pattern, ensuring that the non-repeatability properties of sub-patterns are preserved even when the original image is subsampled. This allows treatment of the input data using subsampling techniques, including pyramidal representations. A multi-resolution De Bruijn pattern can be constructed by first generating a standard De Bruijn pattern, which corresponds to the lowest resolution of the pyramid. A binary value is then inserted between consecutive bits of the original pattern to produce a pattern that has twice the resolution as the original pattern. The inserted values are chosen to ensure that the new pattern satisfies non-repeatability constraints (e.g., by testing the similarity between various portions of the scene at the various multi-resolution patch sizes, there is a high similarity with only one location, the right match). The process of inserting more values between consecutive bits of the previous pattern is repeated to add more "layers" to the pyramid until the final pattern has the desired resolution.

The block matching algorithm as described in, for example, Scharstein et al. is one example of a local method that typically uses a sum of squared (or absolute) differences (SSD) metric applied to an RGB pixel neighborhood. By using a structured light setup in which the projected pattern meets the above conditions, block matching can be applied to the multi-channel data by applying the SSD metric to each of the channels (e.g., the RGB channels as well as the IR channel).

As such, embodiments of the present invention combine two different stereo algorithms, dedicated to invisible (e.g., IR) and visible (e.g., RGB) data, respectively. For example, a block matching algorithm is applied to IR input, producing sparse, but reliable output, is used to seed a semi-global or global dense method using an RGB-based metric. Because the depth estimates are more reliable (or more accurate), they are set to high-confidence values when applying the semi-global or global methods. As such, it is possible to perform searches in the semi-global or global methods in disparity ranges close to the disparity ranges provided by the IR stereo data or in the ranges close to the disparity of the neighboring pixels, thereby resulting in computational cost reduction while achieving high accuracy.

Figure 5A:
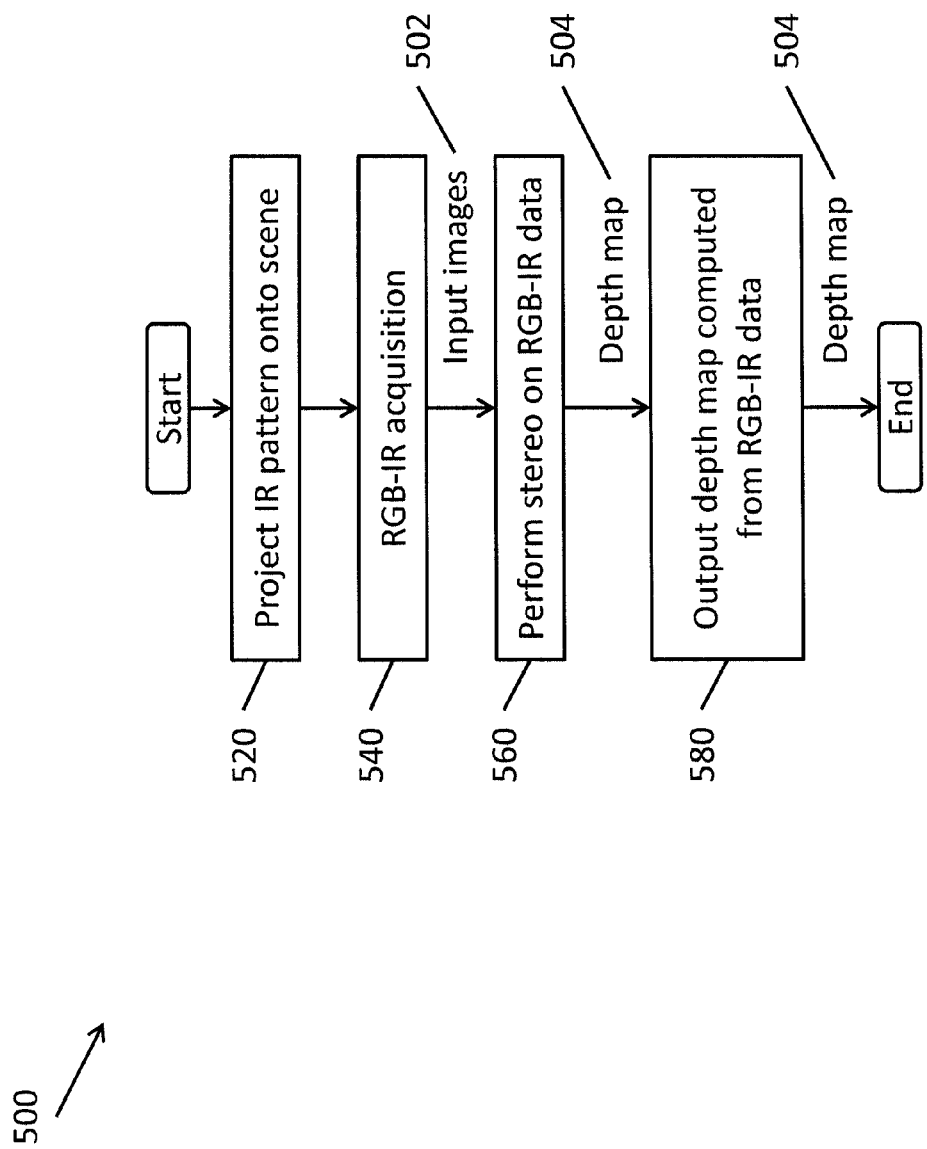
FIG. 5A is a flowchart illustrating a method for generating a three-dimensional reconstruction of a scene using multi-channel data according to one embodiment of the present invention.

FIG. 5A is a flowchart illustrating a method 500 for generating three dimensional reconstructions of scenes using multi-channel data according to one embodiment of the present invention. In operation 520, invisible light (e.g., IR light) is projected onto at least a portion of the scene visible by the first and second cameras 102 and 104. In operation 540, multi-channel input images 502 (which include, for example, red R, blue B, green G, and infrared IR channels) are acquired from the first camera 102 and the second camera 104, where the multi-channel input images capture reflections of the IR pattern that was projected onto the scene in operation 520. In operation 560, stereo analysis is performed on the captured multi-channel data, where the data includes the reflected invisible light pattern to generate a depth map 504 and the depth map 504 may be output from the processor 108 in operation 580.

Figure 5B:
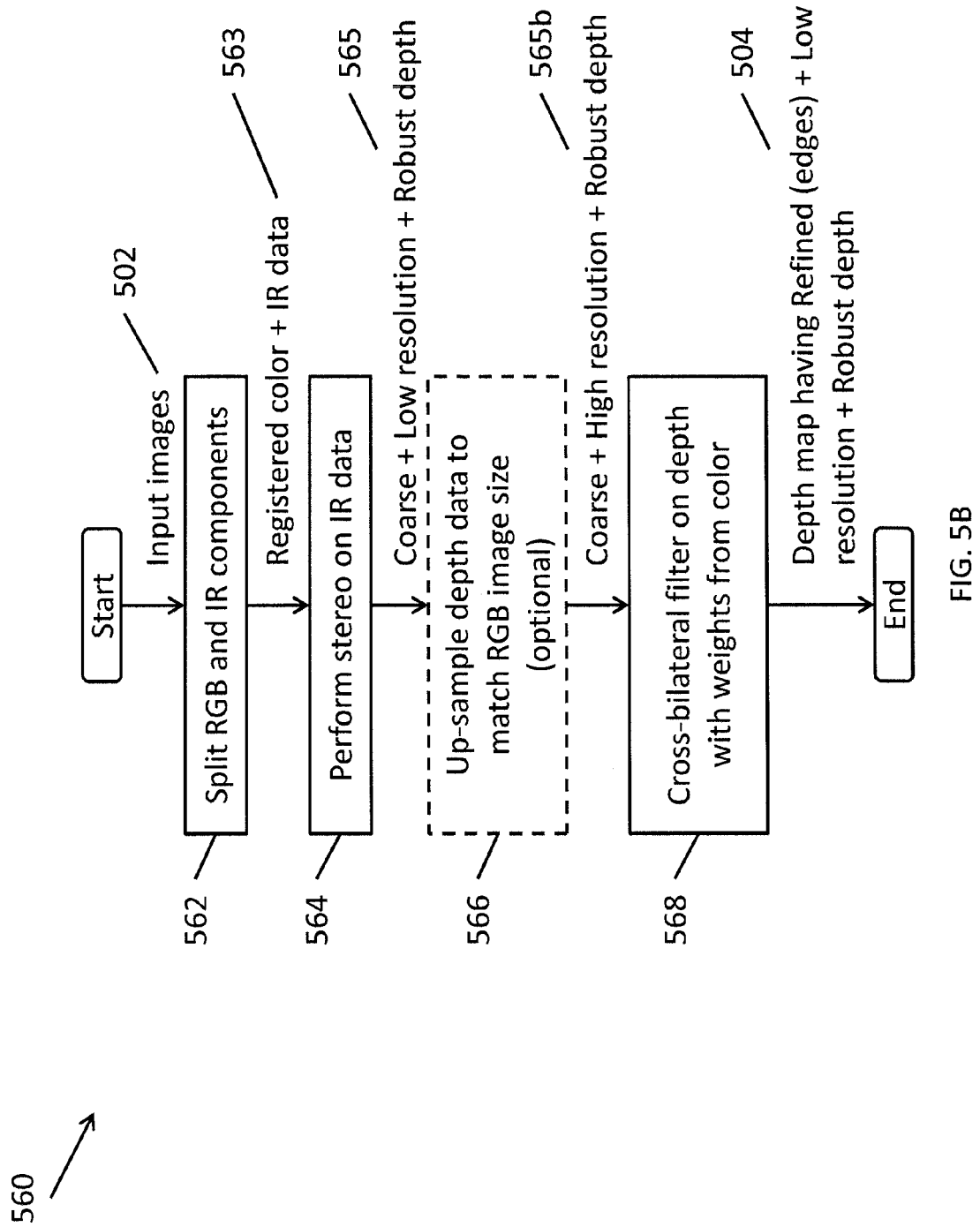
FIG. 5B is a flowchart illustrating a method for combining invisible and visible light data according to one embodiment of the present invention.

FIG. 5B is a flowchart illustrating a method 560 for combining invisible and visible light data according to one embodiment of the present invention. In operation 562, the processor 108 splits the RGB data and the IR components of the input images 502 into registered color (e.g., RGB) and IR data 554. In operation 564, the processor performs a stereo 3D reconstruction technique such as block matching on the IR data, thereby generating coarse, low resolution (e.g., low XY resolution in the image plane) data 556 having robust depth information (due to the reliability of the data that is computed based on the detection of the patterns applied to the scene). In optional operation 566, the processor 108 up-samples (or interpolates) the coarse, low resolution IR data to the size of the captured high resolution RGB image data. In operation 568, the processor 108 refines the edges of the coarse depth map 565 by applying a cross-bilateral filter based on weights from the RGB data streams.

For example, in operation 568, the RGB data can provide more detailed information regarding the locations of edges of objects in the scene. As such, boundaries of regions of the depth map having particular depths (as determined using the IR data) can be refined based on the visible light or RGB data available for the same regions.

As such, embodiments of the present invention provide a systems and methods for three dimensional reconstruction that is aided by a structured light source that uses existing speed-optimized local stereo algorithms (including algorithms tailored to run efficiently on GPUs and FPGAs), yet yields a dense reconstruction that is typically only available from more processor intensive semi-global and global approaches.

In some embodiments of the present invention, regions of the scene having low texture can be identified by performing texture analysis on the captured images. Examples of texture analysis techniques include Gabor filters, local image-values variance analysis filters, and gradients analysis.

In other embodiments of the present invention, regions of the scene having low texture can be identified by analyzing the discriminability of a certain match to assess the confidence of a particular stereo match. For example, embodiments of the present invention may calculate, for a given pixel on the master image (or first image), a confidence score for each pixel of a set of possible conjugate pixels on the slave image (or second image), where a high confidence score indicates a high probability that the pixel of the slave image is the conjugate of the given pixel of the master image. Because the actual match is unique, in an ideal situation, the score value has a distinct peak at the correct matching pixel and has a low value for all other pixels. However, if embodiments of the present invention are unable to calculate a set of scores with such a pattern (e.g., because all of the points appear to be equally likely to be the conjugate of the pixel of the master image), then the region can be labeled as being a texture-less region. Similar issues may arise when the scene contains a horizontally-repetitive pattern (e.g., a repeating pattern extending along the same direction as the epipolar lines), which may result in multi-peaked sets of scores, suggesting ambiguity as to the correct conjugate pixel from the potential conjugate pixels in the slave image.

In one embodiment of the present invention, the computational cost of three dimensional reconstruction can be reduced by limiting the processing to a segment or region of the scene that may be of particular interest for a particular application. For example, in the case of face recognition or gesture detection, the face or hands may be the only section of interest.

As such, for application specific landmarks and features, a method that is integrated with the application-specific detection algorithm is used to identify, in 2D, portions of the captured image that include the desired landmarks and features. A sparse 3D reconstruction algorithm is then used to determine the depth of the said landmarks and features "just-in-time" only in the identified portions of the image.

Figure 6A:
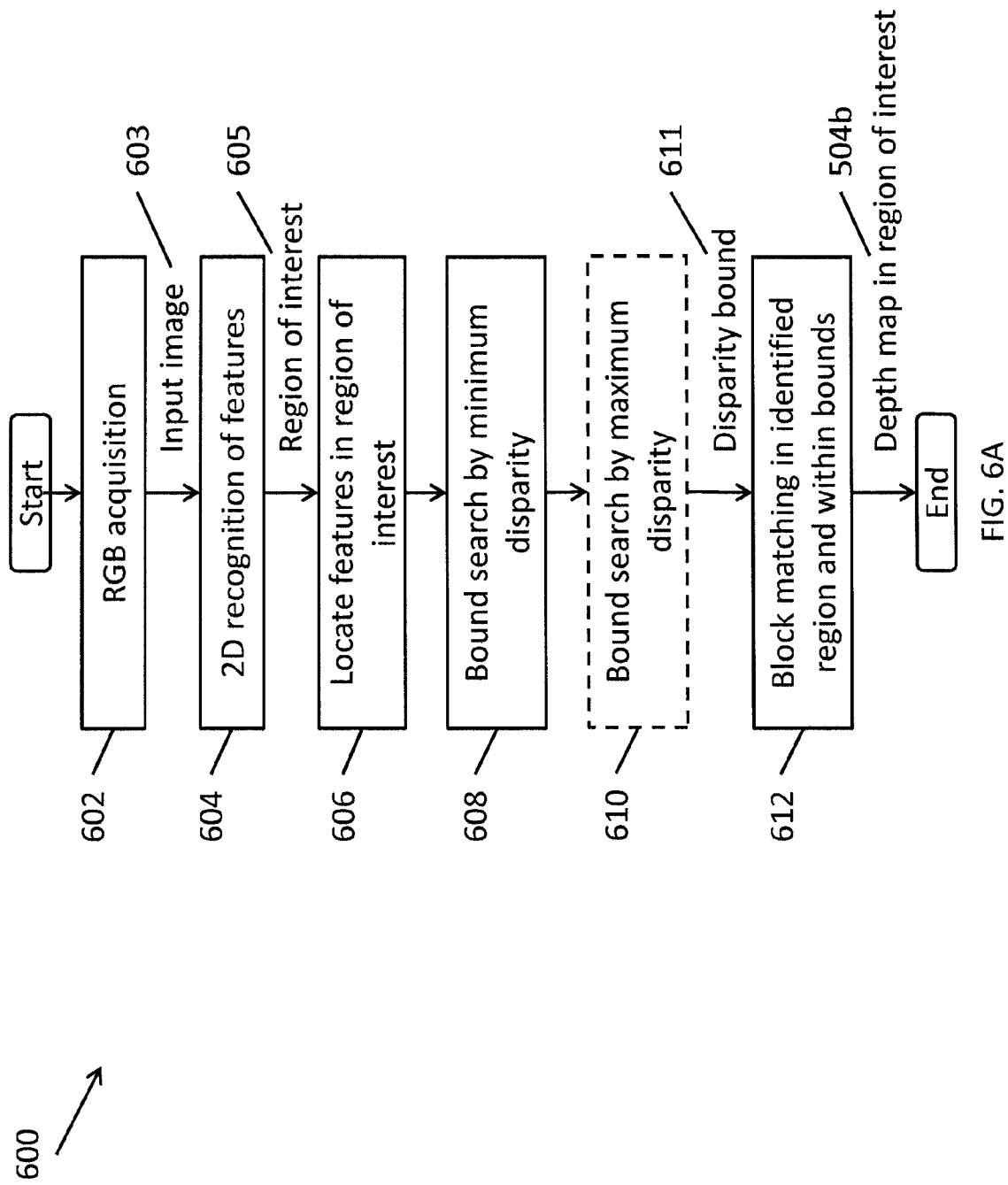
FIG. 6A is a flowchart illustrating a method for performing just-in-time 3D reconstruction according to one embodiment of the present invention.
Figure 6B:
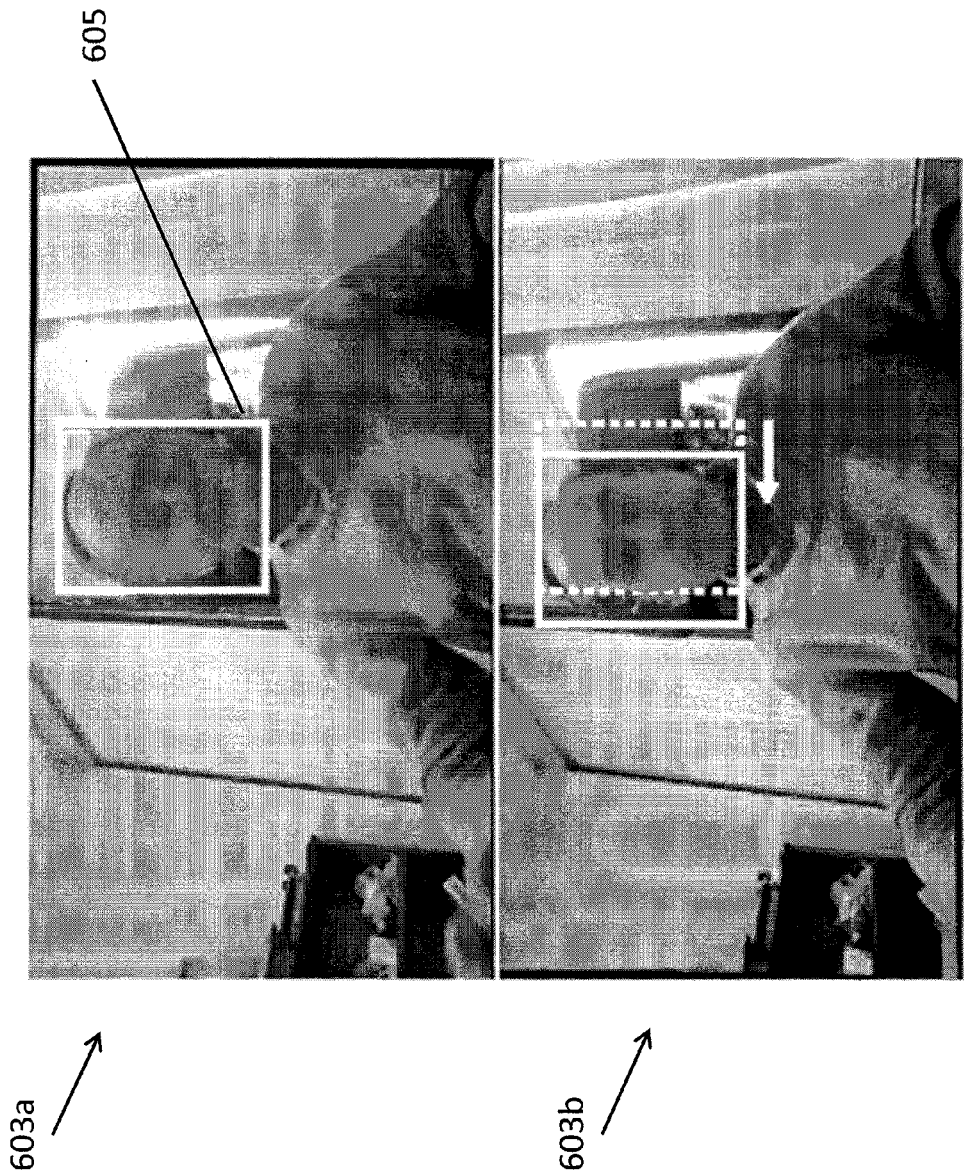
FIG. 6B includes example annotated images showing a detected region of interest according to one embodiment of the present invention.

FIG. 6A is a flowchart illustrating a method for performing just-in-time 3D reconstruction according to one embodiment of the present invention. FIG. 6B shows example annotated images showing a detected region of interest according to one embodiment of the present invention. In operation 602, the processor 108 acquires first and second images 603a and 603b from the first camera 102 and the second camera 104. (In some embodiments, only one image 603 is captured by, for example, the first camera 102 in operation 602.) In operation 604, the processor 108 performs 2D detection to identify a region 605 (e.g., a rectangle) that contains an object of interest (e.g., a face) using an algorithm appropriate to the feature to be detected. For example, when the feature of interest is a face, the Viola-Jones algorithm may be used to detect the region of the image containing the face. In other embodiments, the processor 108 identifies a region of interest by applying the methods of detecting regions of low texture described above in order to detect regions that would benefit from the application of an artificial texture. In operation 606, the processor 108 locates features (e.g., patches with gradients or color changes) in the image within the identified region 605. In operation 608, the processor 108 bounds the search in the second image by a minimum disparity threshold (e.g., the minimum disparity may be 0 for very distant objects or may be larger for closer objects). In operation 610, optionally, the processor 108 may also bound the search space by a maximum disparity threshold. The minimum and maximum disparity bounds can be set based on a coarse estimated distance to the point of interest. In operation 612, the processor 108 performs block matching (e.g., using the SSD metric) in the identified region of the image along the epipolar lines within the minimum (and, if applicable, maximum) disparity thresholds, thereby reducing the computational effort to perform the depth analysis by setting tight bounds around the search space of interest.

In the above described just-in-time method of the 3D reconstruction, the coarse estimated distance to the point of interest may be obtained for operations 608 and 610 by assuming that the feature of interest is substantially flat (e.g., the entire feature is equidistant from the cameras). Having a general idea of the average depth (a distance z) to the feature (in the example of FIG. 6B, a face), allows embodiments of the present invention to confine the search space to disparities between z+d1 and z−d2, where d1 and d2 may be empirically determined. For example, if the average distance to a face is 150 cm, d1 can be 10 cm and d2 can be 20 cm and therefore the search can be limited to disparities corresponding to distances from 130 cm to 160 cm.

Once the search space between the front and back of the object is determined, the algorithm can perform a more detailed matching to find the finer depth details in the image (in the example of a face, the shape of the nose, the cavity of the eyes, etc.) using features of the image. The features can be semantic features such as a pair of eyes or a nose, or imaging features such as color, gradient, texture, etc.

Figure 7A:
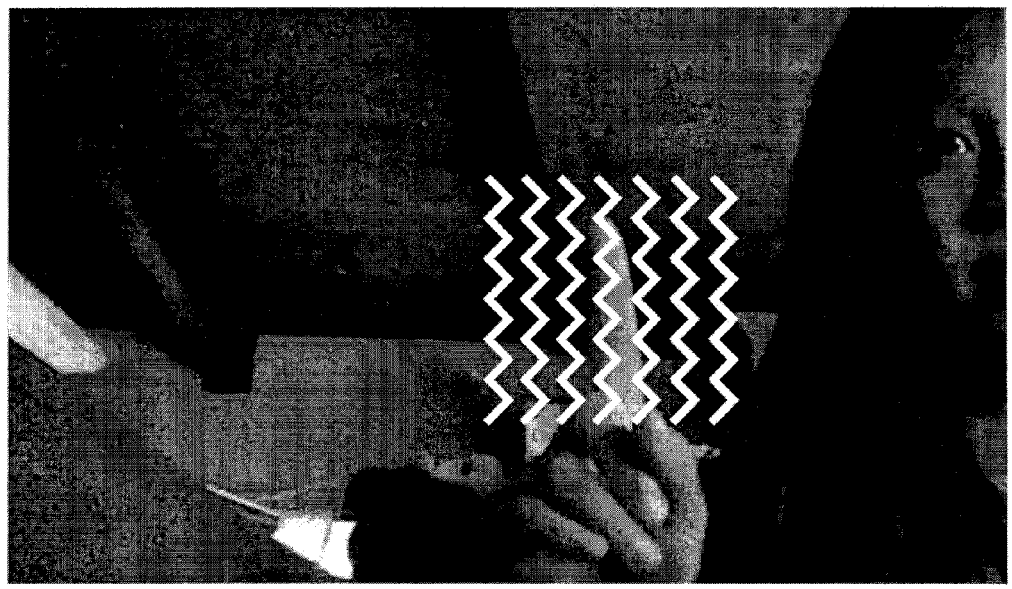
FIG. 7A shows an example annotated image highlighting a region containing a feature of interest according to one embodiment of the present invention.

In some embodiments of the present invention, the projection source 106 is further controllable to project light only onto a particular region of interest in the scene. For example, one potential application of embodiments of the present invention is to generate a 3D reconstruction of a finger. As shown in FIG. 7A, a region of interest containing the finger is detected (the region of interest being depicted by zigzag lines) and the projection source 106 may be configured to emit light only onto the detected region of interest, thereby reducing the power used by the projection source 106 or increasing the amount of power that can be applied to the detected region of interest (e.g., the projection source might otherwise illuminate the entire scene, including regions that do not contain features of interest). Moreover, this technique can be used in order to project a fine (or high resolution) texture narrowly onto the selected region instead of the spreading the texture across the entire scene.

Figure 7B:
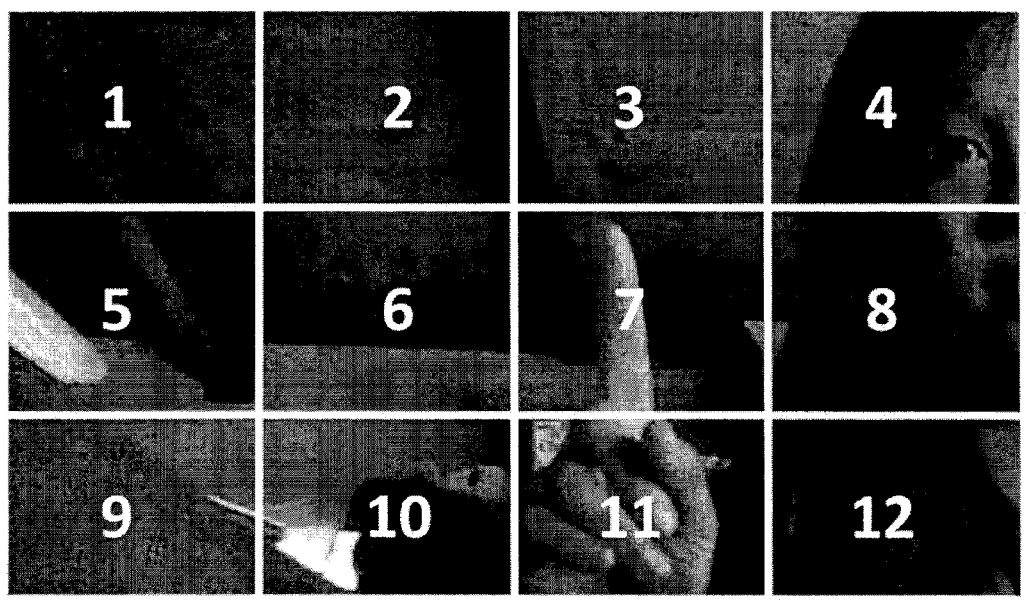
FIG. 7B shows an example annotated image that is divided into twelve segments according to one embodiment of the present invention.

Referring to FIG. 7B, in one embodiment, the scene may be divided into a number of segments, labeled with numbers 1 through 12. In other embodiments of the present invention the scene may be a divided into a different number of segments. The feature of interest in this example (the finger) is located entirely in segment 7. As such, the projection source 106 may be controlled to emit light only into segment 7 and not into segments 1 through 6 or into segments 8 through 12.

Figure 7C:
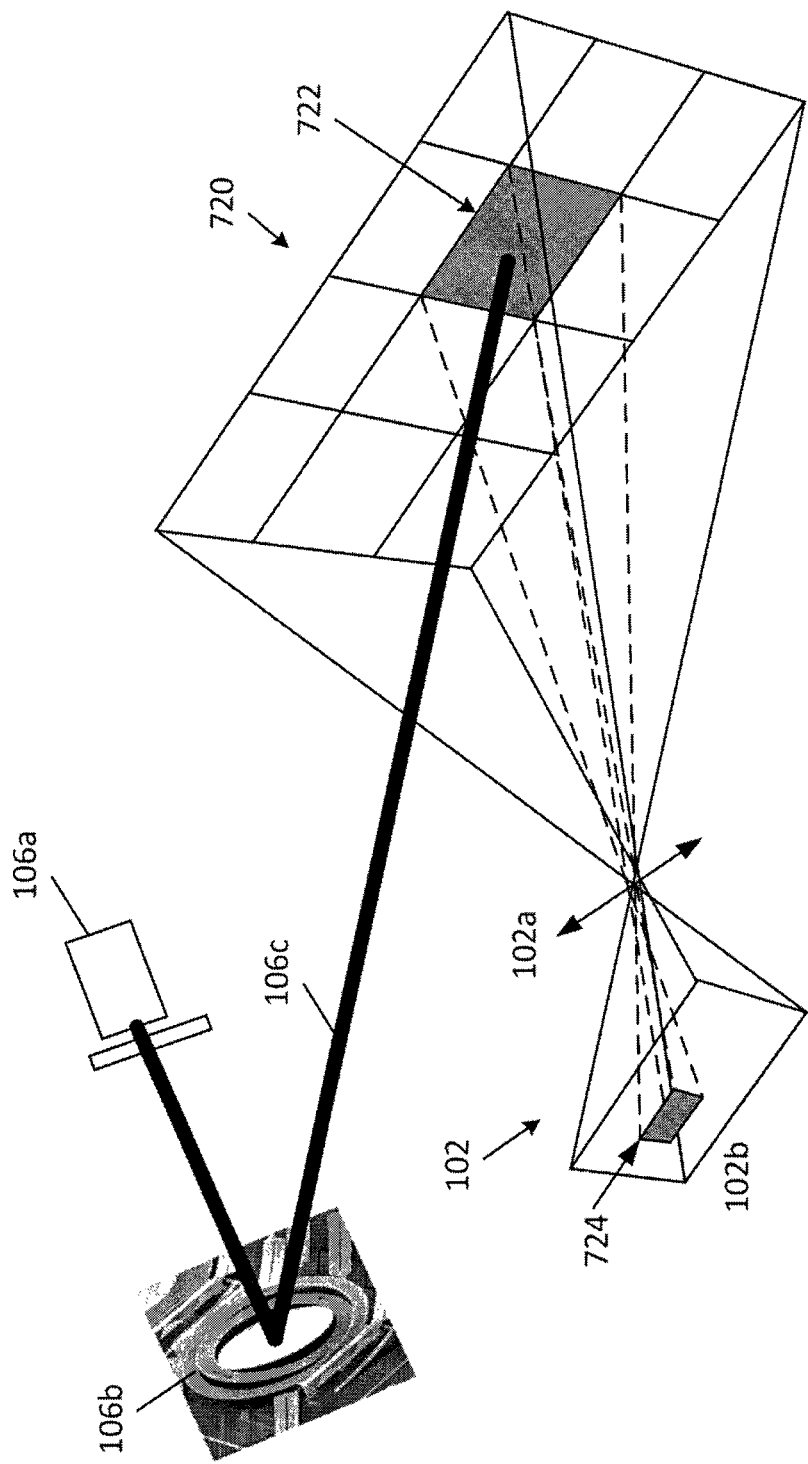
FIG. 7C is a schematic diagram illustrating a system for projecting light onto a region of interest of a scene according to one embodiment of the present invention.

FIG. 7C is a schematic diagram illustrating a system for projecting light onto a region of interest of a scene according to one embodiment of the present invention. Referring to FIG. 7C, in one embodiment, the projection source 106 includes a light source 106a and a scanner mirror 106b (e.g., a microelectricalmechanical system or MEMS device). The scanner mirror 106b and the cameras 102 and 104 may be registered during the manufacturing process and remain substantially rigid (e.g., remain in fixed relative position) with respect to one another. The scanner mirror 106b may be controlled by the processor 108 to reflect light 106c emitted by the light source 106a toward a particular segment of interest 722 of a scene 720 and the cameras 102 and 104 (only one of which is depicted in FIG. 7C) capture an image of the scene, including an image 724 of the particular segment of interest 722. The camera 102 includes a camera lens 102a and an image plane (e.g., the sensor) 102b.

Figure 7D:
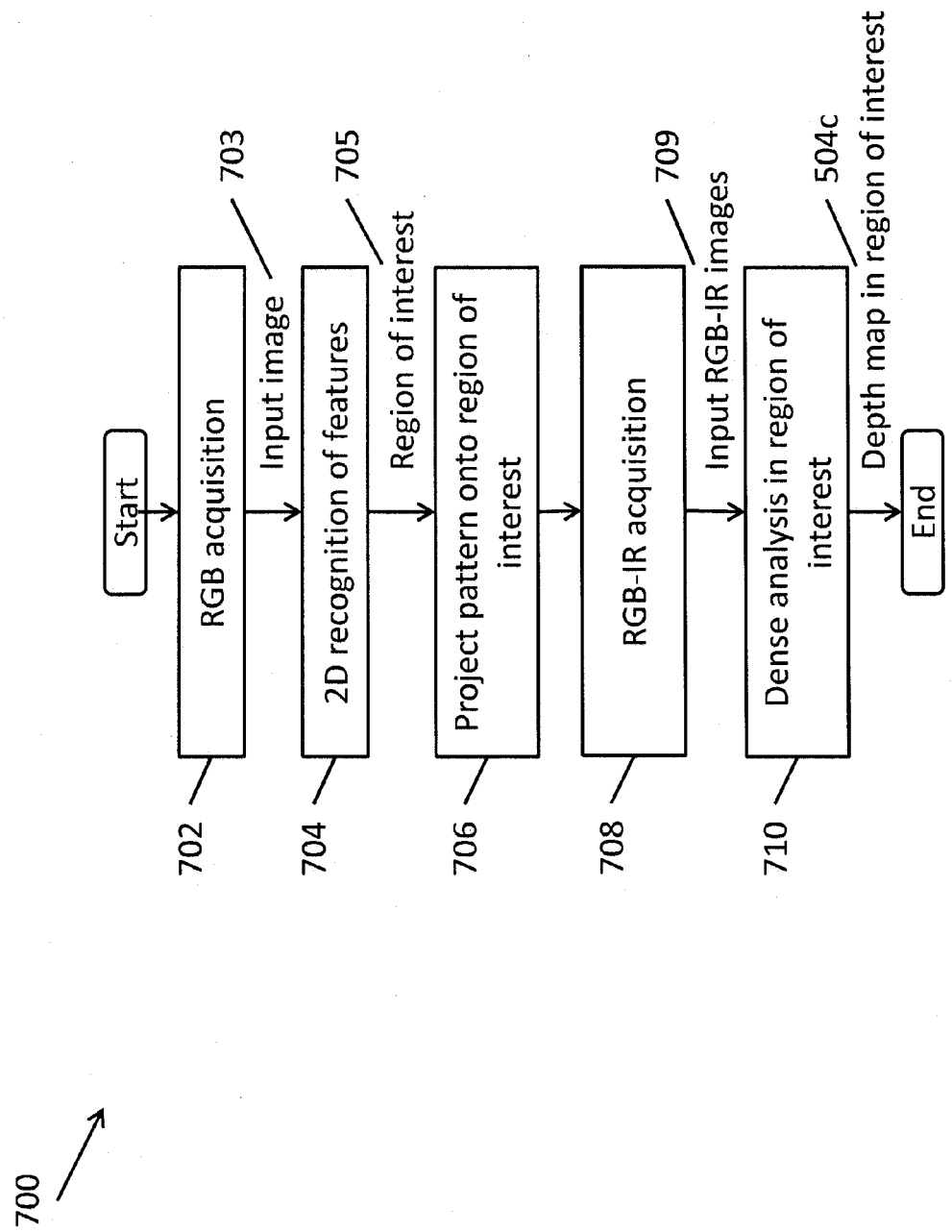
FIG. 7D is a flowchart illustrating a method 700 for performing three-dimensional of a region (or portion) of interest of a scene by projecting light onto the region of interest and analyzing multi-channel data including reflections of the projected light according to one embodiment of the present invention.

FIG. 7D is a flowchart illustrating a method 700 for performing three-dimensional of a region (or portion) of interest of a scene by projecting light onto the region of interest and analyzing multi-channel data including reflections of the projected light according to one embodiment of the present invention. In a manner similar to the method 600 described above with respect to FIG. 6A, in operation 702, the processor 108 acquires input images 703 from the first camera 102 and the second camera 104. (In some embodiments, only one image 703 is captured by, for example, the first camera 102 in operation 702.) In operation 704, the processor 108 performs 2D detection to identify a region of interest 705 (e.g., a rectangle) that contains a feature of interest for a particular application (e.g., in a gesture detection application, the feature of interest may be a finger or a hand). In other embodiments, the processor 108 identifies a region of interest by applying the methods of detecting regions of low texture described above in order to detect regions that would benefit from the application of an artificial texture by the projection source 106. In operation 706, the processor 108 controls the projection source 106 to project a pattern onto the identified region of interest 705. In operation 708, the processor 108 controls the cameras 102 and 104 to perform multi-channel acquisition of images 709 of the scene, thereby capturing some portion of the light projected onto the region of interest 705. In operation 710, dense analysis is performed of the portions of the images 709 corresponding to the region of interest 705 to generate a three-dimensional reconstruction (or a depth map) 504c of the region of interest. This dense analysis may be performed using substantially the same techniques described above with respect to the just-in-time reconstruction using, for example, block matching within the region of interest 705.

Although FIG. 7B depicts a feature of interest to be located entirely within a single segment, in some circumstances features of interest may be located in multiple segments of the scene or may be located across the boundary between two adjacent segments (e.g., the finger may be located across the boundary between segments 3 and 7 as shown in FIG. 7B). As such, the projection source 106 may be controlled to emit light onto multiple segments or may be controlled to emit light onto a region that includes portions of two different segments. In still other embodiments, the projection source may be controlled to emit light toward the center of the detected feature.

In some embodiments of the present invention, the processor 108 controls the projection source 106 to emit the pattern at a power level (e.g., luminance) appropriate for the environmental conditions.

A pixel measures the sum of irradiance from light generated by the projection source 106 and reflected back by a surface patch (or "reflected pattern") and irradiance from ambient illumination (e.g., a light bulb, the Sun, or other external light source) reflected back by the same surface patch (or "reflected ambient light"). To detect the pattern applied by the projection source 106 as a texture, the irradiance from the projection source 106 is controlled so that the reflected pattern is at least a few quantization levels greater than the irradiance of the reflected ambient light. The difference in levels of detected irradiance due to projected light and ambient illumination may be affected by a number of features including:

The quantized measured brightness of at a pixel, which may be affected by exposure time, gain, non-linearity, and number of quantization bits;

Spectral transmittance of the optical filter on the first and second cameras 102 and 104 and spectral distributions of projection source 106 and ambient illumination in the passband of the IR filter;

Surface albedo of the object in the filter's passband, because on dark surfaces, projected and ambient light are more difficult to separate, as their difference in the image is smaller;

Orientation of the surface of the object may have some minor impact, but this impact may be small when the projection source is co-located with the first camera 102 and the second camera 104. For example, for Lambertian surfaces (e.g., diffusely reflecting surfaces), the irradiance is a function of the cosine of the angle $\theta$ between the surface normal and the illumination direction. As such, the worst case is that of a surface facing an external light source while facing away from the projector, but when the projection source 106 is co-located with the cameras, most of the pixels are from surfaces with small angle $\theta$ with respect to the projection source 106 and therefore the circumstance is infrequent. For specular surfaces, the angle relation is more complex (due, for example, to Snell's law), however, in this case too, problems would arise mostly from surface patches that are not front-to-parallel with the camera, which is a minority of the pixels;

Distance of the surface from the projection source 106 and from the external light source may have an impact on the relative contributions of the projected light versus the external light source, because a closer external light source may overwhelm a more distant projection source.

As such, the processor 108 may be configured to control the luminance of the projection source 106 to attempt to cause the detected irradiance of the reflected pattern to be at least a few quantization levels greater than the detected reflected ambient light in a region of interest. In one embodiment, the processor iteratively increases the output power of the projection source 106 until the reflected pattern is detected over the reflected ambient light. In other embodiments, the projection source analyzes the luminance of the reflected ambient light and computes an output power in accordance with the detected conditions. In some circumstances, such as where the ambient light is very bright, the projection source 106 may not be able to project the pattern with enough power to be detectable over the reflected ambient light.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for three-dimensional reconstruction of a scene, the system comprising:
   a first camera comprising a first lens and a first multi-channel image sensor comprising a plurality of visible light detecting pixels and a plurality of invisible light detecting pixels;
   a second camera comprising a second lens and a second multi-channel image sensor comprising a plurality of visible light detecting pixels and a plurality of invisible light detecting pixels;
   a projection source;
   a processor; and a memory storing instructions that, when executed by the processor, cause the processor to:
control the projection source to emit invisible light toward the scene;
control the first multi-channel image sensor to capture a first image, the first image comprising a first invisible light channel and a first visible light channel;
control the second multi-channel image sensor to capture a second image substantially simultaneously as the capture of the first image by the first multi-channel image sensor, the second image comprising a second invisible light channel and a second visible light channel;
perform stereo analysis of the first image and the second image in accordance with the first and second invisible light channels and the first and second visible light channels to generate a depth map by:
performing stereo analysis of the first invisible light channel and the second invisible light channel to generate a coarse depth map; and
applying a cross-bilateral filter on the coarse depth map with weights from the first visible light channel and the second visible light channel to generate the depth map; and
output the depth map.

2. The system of claim 1, wherein the memory further stores instructions that, when executed by the processor, cause the processor to perform stereo analysis of the first image and the second image by:
up-sampling the coarse depth map to a resolution of the first and second visible light channels.

3. The system of claim 1, wherein the projection source is configured to emit infrared light, and
wherein the invisible light detecting pixels are configured to detect infrared light.

4. The system of claim 1, wherein the first visible light channel comprises red, blue, and green color channels, and
wherein the second visible light channel comprises red, blue, and green color channels.

5. The system of claim 1, wherein the projection source is configured to emit the invisible light in a pattern.

6. A system for three-dimensional reconstruction of a scene, the system comprising:
a first camera comprising a first lens and a first multi-channel image sensor comprising a plurality of visible light detecting pixels and a plurality of invisible light detecting pixels;
a second camera comprising a second lens and a second multi-channel image sensor comprising a plurality of visible light detecting pixels and a plurality of invisible light detecting pixels;
a projection source;
a processor; and
a memory storing instructions that, when executed by the processor, cause the processor to:
control the first multi-channel image sensor to capture an initial image before controlling the projection source to emit invisible light toward the scene;
identify a region of interest in the initial image;
control the projection source to emit invisible light toward the scene;
control the first multi-channel image sensor to capture a first image, the first image comprising a first invisible light channel and a first visible light channel;
control the second multi-channel image sensor to capture a second image substantially simultaneously as the capture of the first image by the first multi-channel image sensor, the second image comprising a second invisible light channel and a second visible light channel;
perform stereo analysis of the first image and the second image in accordance with the first and second invisible light channels and the first and second visible light channels to generate a depth map; and
output the depth map.

7. The system of claim 6, wherein the memory further stores instructions that, when executed by the processor, cause the processor to:
detect a feature within the region of interest;
identify a minimum disparity bound in accordance with the feature; and
perform the stereo analysis in accordance with the minimum disparity bound and only within the region of interest.

8. The system of claim 7, wherein the memory further stores instructions that, when executed by the processor, cause the processor to:
identify a maximum disparity bound in accordance with the feature; and
perform the stereo analysis in accordance with the maximum disparity bound.

9. The system of claim 7, wherein the projection source comprises a scanner mirror and a light source configured to emit the invisible light, and
wherein the processor is configured to control the scanner mirror to direct the invisible light emitted by the light source toward only a portion of the scene corresponding to the region of interest.

10. A system for three-dimensional reconstruction of a scene, the system comprising:
a first camera comprising a first lens and a first multi-channel image sensor comprising a plurality of visible light detecting pixels and a plurality of invisible light detecting pixels;
a second camera comprising a second lens and a second multi-channel image sensor comprising a plurality of visible light detecting pixels and a plurality of invisible light detecting pixels;
a projection source;
a processor; and
a memory storing instructions that, when executed by the processor, cause the processor to:
control the projection source to emit invisible light toward the scene;
control the first multi-channel image sensor to capture a first image, the first image comprising a first invisible light channel and a first visible light channel;
control the second multi-channel image sensor to capture a second image substantially simultaneously as the capture of the first image by the first multi-channel image sensor, the second image comprising a second invisible light channel and a second visible light channel;
perform stereo analysis of the first image and the second image in accordance with the first and second invisible light channels and the first and second visible light channels to generate a depth map by:
performing stereo analysis of the first and second invisible light channels to generate an invisible light depth map;
performing stereo analysis of the first and second visible light channels to generate a visible light depth map; and combining the invisible light depth map and the visible light depth map to generate the depth map; and
output the depth map.

11. A method for three-dimensional reconstruction of a scene, the method comprising:
controlling, by a processor, a projection source to emit invisible light toward the scene:
controlling a first multi-channel image sensor to capture a first image, the first multi-channel image sensor comprising a first camera comprising a first lens and a plurality of visible light detecting pixels and a plurality of invisible light detecting pixels, the first image comprising a first invisible light channel and a first visible light channel;
controlling a second multi-channel image sensor to capture a second image substantially simultaneously as the capture of the first image by the first multi-channel image sensor, the second multi-channel image sensor comprising a second camera comprising a second lens and a plurality of visible light detecting pixels and a plurality of invisible light detecting pixels, the second image comprising a second invisible light channel and a second visible light channel;
performing, by the processor, stereo analysis of the first image and the second image in accordance with the first and second invisible light channels and the first and second visible light channels to generate a depth map, the stereo analysis of the first image and the second image comprising:
performing, by the processor, stereo analysis of the first invisible light channel and the second invisible light channel to generate a coarse depth map; and
applying, by the processor, a cross-bilateral filter on the coarse depth map with weights from the first visible light channel and the second visible light channel to generate the depth map; and
outputting, by the processor, the depth map.

12. The method of claim 11, wherein the performing stereo analysis of the first image and the second image further comprises up-sampling the coarse depth map to a resolution of the first and second visible light channels.

13. The method of claim 11, wherein the projection source is configured to emit infrared light, and
wherein the invisible light detecting pixels are configured to detect infrared light.

14. The method of claim 11, wherein the first visible light channel comprises red, blue, and green color channels, and
wherein the second visible light channel comprises red, blue, and green color channels.

15. The method of claim 11, wherein the projection source is configured to emit the invisible light in a pattern.

16. A method for three-dimensional reconstruction of a scene, the method comprising:
controlling the first multi-channel image sensor to capture an initial image before controlling the projection source to emit invisible light toward the scene;
identifying a region of interest in the initial image;
controlling, by a processor, a projection source to emit invisible light toward the scene;
controlling a first multi-channel image sensor to capture a first image, the first multi-channel image sensor comprising a first camera comprising a first lens and a plurality of visible light detecting pixels and a plurality of invisible light detecting pixels, the first image comprising a first invisible light channel and a first visible light channel;
controlling a second multi-channel image sensor to capture a second image substantially simultaneously as the capture of the first image by the first multi-channel image sensor, the second multi-channel image sensor comprising a second camera comprising a second lens and a plurality of visible light detecting pixels and a plurality of invisible light detecting pixels, the second image comprising a second invisible light channel and a second visible light channel;
performing, by the processor, stereo analysis of the first image and the second image in accordance with the first and second invisible light channels and the first and second visible light channels to generate a depth map and
outputting, by the processor, the depth map.

17. The method of claim 16, further comprising:
detecting, by the processor, a feature within the region of interest;
identifying, by the processor, a minimum disparity bound in accordance with the feature; and
performing the stereo analysis in accordance with the minimum disparity bound and only within the region of interest.

18. The method of claim 17, further comprising:
identifying a maximum disparity bound in accordance with the feature; and
performing the stereo analysis in accordance with the maximum disparity bound.

19. The method of claim 17, wherein the projection source comprises a scanner mirror and a light source configured to emit the invisible light, and
wherein the method further comprises controlling the scanner mirror to direct the invisible light emitted by the light source toward only a portion of the scene corresponding to the region of interest.

20. A method for three-dimensional reconstruction of a scene, the method comprising:
controlling, by a processor, a projection source to emit invisible light toward the scene;
controlling a first multi-channel image sensor to capture a first image, the first multi-channel image sensor comprising a first camera comprising a first lens and a plurality of visible light detecting pixels and a plurality of invisible light detecting pixels, the first image comprising a first invisible light channel and a first visible light channel;
controlling a second multi-channel image sensor to capture a second image substantially simultaneously as the capture of the first image by the first multi-channel image sensor, the second multi-channel image sensor comprising a second camera comprising a second lens and a plurality of visible light detecting pixels and a plurality of invisible light detecting pixels, the second image comprising a second invisible light channel and a second visible light channel;
performing, by the processor, stereo analysis of the first image and the second image in accordance with the first and second invisible light channels and the first and second visible light channels to generate a depth map, the stereo analysis of the first image and the second image comprising:
performing stereo analysis of the first and second invisible light channels to generate an invisible light depth map;
performing stereo analysis of the first and second visible light channels to generate a visible light depth map; and combining the invisible light depth map and the visible light depth map to generate the depth map; and
outputting, by the processor, the depth map.

* * * * *